United States Patent
Kirby et al.

(10) Patent No.: US 11,410,467 B2
(45) Date of Patent: *Aug. 9, 2022

(54) ELECTRONIC TICKETING SYSTEM

(71) Applicant: Tixserve Limited, Clane (IE)

(72) Inventors: James Kirby, Nenagh (IE); Patrick Kirby, Clane (IE)

(73) Assignee: Tixserve Limited, Clane (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,176

(22) Filed: Mar. 1, 2021

(65) Prior Publication Data

US 2021/0201597 A1 Jul. 1, 2021

Related U.S. Application Data

(63) Continuation of application No. 16/302,879, filed as application No. PCT/EP2017/062049 on May 18, 2017, now Pat. No. 10,937,251.

(30) Foreign Application Priority Data

May 18, 2016 (GB) ..................................... 1608749

(51) Int. Cl.
*G06K 5/00* (2006.01)
*G06K 7/01* (2006.01)
(Continued)

(52) U.S. Cl.
CPC ............ *G07B 11/00* (2013.01); *G06K 7/1417* (2013.01); *G06Q 10/02* (2013.01); *G07B 15/00* (2013.01); *G06Q 20/047* (2020.05)

(58) Field of Classification Search
CPC ...... G07B 11/00; G07B 15/00; G06K 7/1417; G06Q 10/02
(Continued)

(56) References Cited

U.S. PATENT DOCUMENTS

2003/0066883 A1* 4/2003 Yu .................. G06Q 20/327
235/382
2014/0270335 A1* 9/2014 Larson ................. G06T 1/0021
382/100
(Continued)

FOREIGN PATENT DOCUMENTS

GB 2460240 A * 11/2009 ............. G06Q 20/32

*Primary Examiner* — Tuyen K Vo
(74) *Attorney, Agent, or Firm* — Michael Crilly, Esquire (57) ABSTRACT

The present invention is directed towards an electronic ticket suitable for providing entry to an event. The electronic ticket is capable of being stored, in electronic format, on a mobile user device. The electronic ticket comprises a dynamic entry code for the event such that the dynamic entry code is transitionable from an inoperable state to a functional state, whereby entry to the event is only possible when the dynamic entry code has been transitioned to the functional state. The dynamic entry code is a visual code which is non-readable by humans and is stored in a memory of the mobile user device, such that the inoperable state of the dynamic entry code prohibits the visual code from being displayed by the mobile user device and the functional state of the dynamic entry code permits the visual code to be displayed by the mobile user. The advantage of providing the dynamic entry code is that the electronic ticket can hide the entry code until close to the event start time so that a ticket tout will find it difficult to sell the ticket on as a purchaser would have less confidence in buying a ticket which does not display the entry code required for admission. Moreover, a ticket fraudster cannot duplicate the ticket.

17 Claims, 5 Drawing Sheets

(51) Int. Cl.
    *G07B 11/00*       (2006.01)
    *G07B 15/00*       (2011.01)
    *G06Q 10/02*       (2012.01)
    *G06K 7/14*         (2006.01)
    *G06Q 20/04*       (2012.01)

(58) Field of Classification Search
    USPC .................................. 235/375, 382, 462.01
    See application file for complete search history.

(56) References Cited

U.S. PATENT DOCUMENTS

2016/0364590 A1* 12/2016 Wadley ................ G06Q 20/384
2017/0206474 A1*  7/2017 McDonald ............ G07B 15/00

* cited by examiner

ELECTRONIC TICKETING SYSTEM

CROSS REFERENCE TO RELATED APPLICATIONS

This application is a continuation of U.S. patent application Ser. No. 16/302,879 filed Nov. 19, 2018 which is a national phase to PCT Application No. PCT/EP2017/062049 filed May 18, 2017, which in turn claims priority to UK Patent Application No. GB1608749.6 filed May 18, 2016, all said applications being incorporated in their entirety herein by reference thereto.

FEDERALLY SPONSORED RESEARCH AND DEVELOPMENT

None.

BACKGROUND OF THE INVENTION

1. Field of the Invention

This invention relates to an electronic ticketing system and method for providing electronic tickets for an event, which facilitates a possibility for trustworthy re-sale of the electronic tickets.

2. Background

Throughout this specification, the term "electronic ticket" and associated derivations of same shall be understood to encompass any type of ticket or pass or code which is maintained in electronic format for use, and will permit admission to an event. It will be understood that the event referred to through the specification can be any type of limited admission event such as a sports match, music gig, and so on.

Tickets for large-scale events are typically sold by primary ticket agents for a defined market price. However, there is a problem where tickets fall into the hands of individuals and companies who seek to re-sell tickets for popular events at inflated prices. These individuals are sometimes referred to as ticket touts or scalpers. These ticket touts are able to make a profit by purchasing a number of tickets from the primary ticket agent, using a team of people or software which can be used to purchase tickets in an automated fashion using online ticketing websites. The ticket touts then re-sell the tickets on a secondary market at an inflated price, for an amount exceeding the defined market price.

This is undesirable as genuine fans, members of the public, and event goers in general can oftentimes find themselves unable to purchase tickets for an event as the ticket touts have been able to act in a very speedy fashion to secure large quantities of the tickets and will only re-sell the tickets to the event goers at inflated prices. Of course, many genuine fans cannot afford the tickets at the inflated prices.

Although there have been attempts to curb this activity, such as limiting the maximum number of tickets each person can buy, the problem still exists. The ticket touts easily circumvent limited ticket sale rules by creating multiple accounts and/or using multiple credit cards or multiple payment services.

The tickets are usually a hardcopy ticket which is printed on paper or a light cardboard and contains a static entry code, such as a barcode or QR code. More recently, tickets have started to be issued electronically, which are then printed off by the user to create a hardcopy ticket, or alternatively the electronic ticket can be displayed on a screen of a mobile user device. Again, a static entry code is displayed on the screen for such electronic tickets that are not printed off.

The static entry code is read by a scanner and entrance to the event is allowed if the code scans successfully.

As the entry code is static, it is easy for a fraudster to create multiple copies of seemingly legitimate tickets and sell these seemingly legitimate tickets to unsuspecting fans. The unsuspecting fans will only realize there is an issue with the ticket when they attempt entry to the event.

Furthermore, a purchaser will feel more confident when purchasing a ticket on the secondary market when the ticket has a static code as they may be able to compare the ticket from a ticket tout to a ticket they know to be genuine. This confidence is important as without it, a ticket tout would find it more difficult to sell tickets on the secondary market.

Thus, ticket fraud and re-selling of tickets is more difficult to prevent when static entry codes are used. A solution is sought to the problem of ticket touting and ticket fraud. Moreover, a solution which does not eliminate the possibility of re-selling a ticket is sought as re-selling a ticket is occasionally necessary and is for a legitimate reason.

One of the problems with ticket re-selling is that it is difficult to differentiate a genuine fan from a ticket tout from a ticket fraudster. There is effectively no difference, in transactional terms, between a genuine fan re-selling their ticket at the defined market price and a ticket tout re-selling a ticket at an inflated price. This problem is further compounded by the use of the static entry codes which facilitate the relatively easy re-selling of tickets by ticket touts and ticket duplication and ticket forging by fraudsters.

It is a goal of the present invention to provide a method of providing electronic tickets and a ticketing system that overcomes at least one of the above mentioned problems.

SUMMARY OF THE INVENTION

The present invention is directed towards an electronic ticket suitable for providing entry to an event, the electronic ticket capable of being stored on a mobile user device, wherein the electronic ticket comprises a dynamic entry code for the event such that the dynamic entry code is transitionable from an inoperable state to a functional state, whereby entry to the event is only possible when the dynamic entry code has been transitioned to the functional state; wherein, the dynamic entry code is a visual code which is non-readable by humans, such that the inoperable state of the dynamic entry code prohibits the visual code from being displayed by the mobile user device and the functional state of the dynamic entry code permits the visual code to be displayed by the mobile user.

The advantage of providing the dynamic entry code is that the electronic ticket can hide the entry code until close to the event start time so that a ticket tout will find it difficult to sell the ticket on as a purchaser would have less confidence in buying a ticket which does not display the entry code required for admission. Moreover, a ticket fraudster cannot duplicate the ticket.

In a further embodiment, at the time of purchase the electronic ticket is assigned to one or more of: a ticket holder's name, a ticket holder's telephone number, and/or a ticket holder's device ID, such that, prior to allowing the dynamic entry code to be transitioned from the inoperable state to the functional state, one or more of the ticket holder's name, the ticket holder's telephone number, and/or the ticket holder's device ID is checked to ensure a match with a name associated with the mobile user device, a telephone number of the mobile user device, and/or a device ID of the mobile user device, respectively.

In a further embodiment, the electronic ticket is assigned to a ticket holder's name at a time of purchase.

In a further embodiment, the electronic ticket is assigned to a ticket holder's telephone number at a time of purchase.

In a further embodiment, the electronic ticket is assigned to a ticket holder's name and a ticket holder's telephone number at a time of purchase.

In a further embodiment, the electronic ticket is assigned to a ticket holder's device ID at a time of purchase.

In a further embodiment, the electronic ticket is assigned to a ticket holder's name and a ticket holder's telephone number and a ticket holder's device ID at a time of purchase.

In a further embodiment, the ticket holder's telephone number assigned to the electronic ticket must match the telephone number of the mobile user device in order to allow the dynamic entry code to transition from the inoperable state to the functional state.

In a further embodiment, the ticket holder's telephone number assigned to the electronic ticket must match the telephone number of the mobile user device in order to allow the dynamic entry code to become stored on the mobile user device.

In a further embodiment, the ticket holder's name and the ticket holder's telephone number assigned to the electronic ticket must match the name associated with the user device and the telephone number of the mobile user device in order to allow the dynamic entry code to transition from the inoperable state to the functional state.

In a further embodiment, the ticket holder's name and the ticket holder's telephone number assigned to the electronic ticket must match the name associated with the user device and the telephone number of the mobile user device in order to allow the dynamic entry code to become stored on the mobile user device.

In a further embodiment, the ticket holder's name and the ticket holder's telephone number and the ticket holder's device ID assigned to the electronic ticket must match the name associated with the user device and the telephone number of the mobile user device and the device ID of the mobile user device in order to allow the dynamic entry code to transition from the inoperable state to the functional state.

Having such a triple check for identification will reduce the instances of fraud considerably as it is very difficult for a ticket tout to operate within an environment where the device ID of a mobile phone must match a device ID of a user account which would have been established at the time of purchase, and also to match with the telephone number of the mobile phone device, and also to match with the name of the ticket holder, where that name could be counter-checked by event staff requiring photographic identification in that name. The possibility of the ticket being sold on by a tout is much less as a result of this triple check security measure. Even in the above embodiments, where just a name or a telephone number or a device ID, or a combination of any two of these, is also viewed as a greatly increased security measure.

In a further embodiment, the ticket holder's name and the ticket holder's telephone number and the ticket holder's device ID assigned to the electronic ticket must match the name associated with the user device and the telephone number of the mobile user device and the device ID of the mobile user device in order to allow the dynamic entry code to become stored on the mobile user device.

In a further embodiment, the dynamic entry code is transitioned from the inoperable state to the functional state based on an activator which is physically located adjacent an entry point of the event.

In a further embodiment, the dynamic entry code is transitioned from the inoperable state to the functional state in response to the mobile user device scanning a code which is physically located adjacent an entry point of the event.

In a further embodiment, the dynamic entry code is transitioned from the inoperable state to the functional state if a user credibility rating associated with the mobile user device is above a predefined threshold.

In a further embodiment, the user credibility rating is calculated based on a user's historical ticketing transactions.

In a further embodiment, the user's historical ticketing transactions comprise one or more of: number of tickets purchased; aggregate value of tickets purchased; number of tickets re-sold; aggregate value of tickets re-sold; number of tickets used; aggregate value of tickets used; number of tickets not used; aggregate value of tickets not used.

In a further embodiment, the user credibility rating is calculated based on a ratio of the number of tickets re-sold as compared to the number of tickets used.

In a further embodiment, the user credibility rating is calculated based on a ratio of the aggregate value of tickets re-sold as compared to the aggregate value of tickets used.

In a further embodiment, the user credibility rating is calculated based on a ratio of the number of tickets purchased as compared to the number of tickets re-sold.

In a further embodiment, the electronic ticket is capable of being marked as having been used.

In a further embodiment, the electronic ticket is marked as used when a PIN is input to the mobile user device. In a further embodiment, the electronic ticket is marked as used when an alphanumeric code is input to the mobile user device. In a further embodiment, the electronic ticket is marked as used when a code is scanned into the mobile user device.

In a further embodiment, the visual code is a Quick Response (QR) code which is only displayed on a screen of the mobile user device when the QR code has been transitioned to the functional state. In a further embodiment, the visual code is a barcode which is only displayed on a screen of the mobile user device when the barcode has been transitioned to the functional state.

The present invention is further directed towards a method of providing an electronic ticket suitable for providing entry to an event, the electronic ticket capable of being stored on a mobile user device, wherein the method comprises: issuing the electronic ticket, the electronic ticket comprising a dynamic entry code to allow access to the event such that the dynamic entry code is transitionable from an inoperable state to a functional state; storing at least a portion of the dynamic entry code on the mobile user device, the dynamic entry code comprising a visual code which is non-readable by humans; transitioning the dynamic entry code to the functional state to allow entry to the event; whereby, the inoperable state of the dynamic entry code prohibits the visual code from being displayed by the mobile user device and the functional state of the dynamic entry code permits the visual code to be displayed by the mobile user.

The present invention is further directed towards a method of providing an electronic ticket suitable for providing entry to an event, the electronic ticket capable of being stored on a mobile user device, wherein the method comprises: assigning, at the time of purchase, the electronic ticket to one or more of: a ticket holder's name, a ticket holder's telephone number, and/or a ticket holder's device ID; issuing the electronic ticket, the electronic ticket comprising a dynamic entry code to allow access to the event such that the dynamic entry code is transitionable from an inoperable state to a functional state; storing at least a portion of the dynamic entry code on the mobile user device, the dynamic entry code comprising a visual code which is non-readable by humans; checking one or more of the ticket holder's name, the ticket holder's telephone number, and/or the ticket holder's device ID to ensure a match with a name associated with the mobile user device, a telephone number of the mobile user device, and/or a device ID of the mobile user device, and only allowing the dynamic entry code to be transitioned from the inoperable state to the functional state where such a match exists; transitioning the dynamic entry code to the functional state to allow entry to the event; whereby, the inoperable state of the dynamic entry code prohibits the visual code from being displayed by the mobile user device and the functional state of the dynamic entry code permits the visual code to be displayed by the mobile user.

In a further embodiment, the method further comprises the step of assigning the electronic ticket to a ticket holder's name at a time of purchase.

In a further embodiment, the method further comprises the step of assigning the electronic ticket to a ticket holder's name and a ticket holder's telephone number at a time of purchase.

In a further embodiment, the method further comprises the step of checking that a ticket holder's telephone number which has been assigned to the electronic ticket matches the telephone number of the mobile user device prior to allowing the dynamic entry code to transition from the inoperable state to the functional state.

In a further embodiment, the method further comprises the step of checking that a ticket holder's telephone number which has been assigned to the electronic ticket matches the telephone number of the mobile user device prior to allowing the dynamic entry code to be stored on the mobile user device.

In a further embodiment, the method further comprises the step of transitioning the dynamic entry code from the inoperable state to the functional state subsequent to an interaction with an activator which is physically located adjacent an entry point of the event.

In a further embodiment, the method further comprises the step of transitioning the dynamic entry code from the inoperable state to the functional state subsequent to the mobile user device scanning a code which is physically located adjacent an entry point of the event.

In a further embodiment, the step of transitioning the dynamic entry code from the inoperable state to the functional state is carried out if a user credibility rating associated with the mobile user device is above a predefined threshold.

In a further embodiment, the user credibility rating is calculated based on a user's historical ticketing transactions.

In a further embodiment, the user's historical ticketing transactions comprise one or more of: number of tickets purchased; aggregate value of tickets purchased; number of tickets re-sold; aggregate value of tickets re-sold; number of tickets used; aggregate value of tickets used; number of tickets not used; aggregate value of tickets not used.

In a further embodiment, the user credibility rating is calculated based on a ratio of the number of tickets re-sold as compared to the number of tickets used.

In a further embodiment, the user credibility rating is calculated based on a ratio of the aggregate value of tickets re-sold as compared to the aggregate value of tickets used.

In a further embodiment, the user credibility rating is calculated based on a ratio of the number of tickets purchased as compared to the number of tickets re-sold.

In a further embodiment, the method further comprises a step marking the electronic ticket as having been used, once the electronic ticket has been used to provide entry to the event.

In a further embodiment, the step marking the electronic ticket as having been used is carried out by inputting a PIN into the mobile user device.

In a further embodiment, the step marking the electronic ticket as having been used is carried out by inputting an alphanumeric code into the mobile user device.

In a further embodiment, the step marking the electronic ticket as having been used is carried out by scanning a code into the mobile user device.

In a further embodiment, the visual code is a Quick Response (QR) code which is only displayed on a screen of the mobile user device when the QR code has been transitioned to the functional state.

In a further embodiment, the visual code is a barcode which is only displayed on a screen of the mobile user device when the barcode has been transitioned to the functional state.

The present invention is further directed to an electronic ticket suitable for providing entry to an event, the electronic ticket capable of being stored on a mobile user device, wherein the electronic ticket comprises a dynamic entry code for the event such that the dynamic entry code is transitionable from an inoperable state to a functional state, whereby entry to the event is only possible when the dynamic entry code has been transitioned to the functional state.

In a further embodiment, the dynamic entry code is a challenge response code stored in a memory of the mobile user device, wherein the inoperable state of the dynamic entry code prohibits the challenge response code from being transmitted by the mobile user device and the functional state of the dynamic entry code permits the challenge response code to be transmitted by the mobile user.

This is particularly advantageous as the ticket fraudster will not be able to forge the tickets as the entry code, even in its functional state, will be completely hidden from the fraudster.

In a further embodiment, the dynamic entry code is a visual code stored in a memory of the mobile user device, wherein the inoperable state of the dynamic entry code prohibits the visual code from being displayed by the mobile user device and the functional state of the dynamic entry code permits the visual code to be displayed by the mobile user. This allows the use of legacy scanner machines present at many larger event venues.

In a further embodiment, the dynamic entry code stored on the mobile user device may be altered prior to the dynamic entry code being transitioned from the inoperable state to the functional state.

In a further embodiment, the dynamic entry code is transitioned from the inoperable state to the functional state based on a geographical location of the mobile user device.

In a further embodiment, the dynamic entry code is transitioned from the inoperable state to the functional state based on the time. The time can preferably be a server-based time, or a mobile user device-based time. In a further embodiment, the dynamic entry code is transitioned from the inoperable state to the functional state based on the time and on a geographical location of the mobile user device. In a further embodiment, the dynamic entry code is transitioned from the inoperable state to the functional state based on a broadcast command received by the mobile user device. In a further embodiment, the dynamic entry code is transitioned from the inoperable state to the functional state based on a geographical location characteristic. In a further embodiment, the dynamic entry code is transitioned from the inoperable state to the functional state based on an activator which is physically located adjacent an entry point of the event. In a further embodiment, the dynamic entry code is transitioned from the inoperable state to the functional state based on a PIN code which is only known to event staff and may be input into the mobile user device in order to permit the electronic ticket to be transitioned from the inoperable state to the functional state. This feature is useful where connectivity at the venue is insufficient to allow a signal to be received by the mobile user device to cause the dynamic entry code to be transitioned from the inoperable state to the functional state.

In a further embodiment, the dynamic entry code is transitioned from the inoperable state to the functional state if a user credibility rating associated with the mobile user device is above a predefined threshold.

In a further embodiment, the user credibility rating is calculated based on a user's historical ticketing transactions.

In a further embodiment, the user's historical ticketing transactions comprise one of more of: number of tickets purchased; aggregate value of tickets purchased; number of tickets re-sold; aggregate value of tickets re-sold; number of tickets used; aggregate value of tickets used; number of tickets not used; aggregate value of tickets not used. In a further embodiment, the user credibility rating is calculated based on a ratio of the number of tickets re-sold as compared to the number of tickets used. In a further embodiment, the user credibility rating is calculated based on a ratio of the aggregate value of tickets re-sold as compared to the aggregate value of tickets used. In a further embodiment, the user credibility rating is calculated based on a ratio of the number of tickets purchased as compared to the number of tickets re-sold.

In a further embodiment, the visual code is a Quick Response (QR) code which is only displayed on a screen of the mobile user device when the QR code has been transitioned to the functional state.

In a further embodiment, the visual code is a barcode which is only displayed on a screen of the mobile user device when the barcode has been transitioned to the functional state.

The present invention is further directed towards a method of providing an electronic ticket suitable for providing entry to an event, the electronic ticket capable of being stored on a mobile user device, wherein the method comprises; issuing the electronic ticket for storage on the mobile user device, the electronic ticket comprising a dynamic entry code to allow access to the event such that the dynamic entry code is transitionable from an inoperable state to a functional state; and, transitioning the dynamic entry code to the functional state to allow entry to the event.

In a further embodiment, the dynamic entry code is a challenge response code stored in a memory of the mobile user device, wherein the inoperable state of the dynamic entry code prohibits the challenge response code from being transmitted by the mobile user device and the functional state of the dynamic entry code permits the challenge response code to be transmitted by the mobile user.

In a further embodiment, the dynamic entry code is a visual code stored in a memory of the mobile user device, wherein the inoperable state of the dynamic entry code prohibits the visual code from being displayed by the mobile user device and the functional state of the dynamic entry code permits the visual code to be displayed by the mobile user.

In a further embodiment, the method comprises the step of altering the dynamic entry code stored on the mobile user device prior to the dynamic entry code being transitioned from the inoperable state to the functional state.

In a further embodiment, the step of transitioning the dynamic entry code from the inoperable state to the functional state is carried out based on a geographical location of the mobile user device. In a further embodiment, the step of transitioning the dynamic entry code from the inoperable state to the functional state is carried out based on the time. In a further embodiment, the step of transitioning the dynamic entry code from the inoperable state to the functional state is carried out based on the time and on a geographical location of the mobile user device. In a further embodiment, the step of transitioning the dynamic entry code from the inoperable state to the functional state is carried out based on a broadcast command received by the mobile user device. In a further embodiment, the step of transitioning the dynamic entry code from the inoperable state to the functional state is carried out based on a geographical location characteristic. In a further embodiment, the step of transitioning the dynamic entry code from the inoperable state to the functional state is carried out based on an activator which is physically located adjacent an entry point of the event. In a further embodiment, the step of transitioning the dynamic entry code from the inoperable state to the functional state is carried out based on a controlled trigger. In a preferred embodiment, the controlled trigger is a broadcast command signal receivable by the mobile user device.

In a further embodiment, the step of transitioning the dynamic entry code from the inoperable state to the functional state is carried out if a user credibility rating associated with the mobile user device is above a predefined threshold.

In a further embodiment, the user credibility rating is calculated based on a user's historical ticketing transactions.

In a further embodiment, the user's historical ticketing transactions comprise one or more of: number of tickets purchased; aggregate value of tickets purchased; number of tickets re-sold; aggregate value of tickets re-sold; number of tickets used; aggregate value of tickets used; number of tickets not used; aggregate value of tickets not used.

In a further embodiment, the user credibility rating is calculated based on a ratio of the number of tickets re-sold as compared to the number of tickets used. In a further embodiment, the user credibility rating is calculated based on a ratio of the aggregate value of tickets re-sold as compared to the aggregate value of tickets used. In a further embodiment, the user credibility rating is calculated based on a ratio of the number of tickets purchased as compared to the number of tickets re-sold.

In a further embodiment, the visual code is a Quick Response (QR) code which is only displayed on a screen of the mobile user device when the QR code has been transitioned to the functional state.

In a further embodiment, the visual code is a barcode which is only displayed on a screen of the mobile user device when the barcode has been transitioned to the functional state.

BRIEF DESCRIPTION OF THE DRAWINGS

The invention will be more clearly understood from the following description of some embodiments thereof, given by way of example only, with reference to the accompanying drawings.

DETAILED DESCRIPTION OF THE INVENTION

It is important to appreciate that the present invention is primarily directed towards a dynamic entry code which forms part of an electronic ticket that is capable of being stored on a mobile user device. The purpose of the dynamic entry code is to allow the electronic ticket to be viewed, without displaying or making available the entry code in its functional state. To facilitate this, initially the entry code may be displayed and/or stored in an inoperable state which would not permit admission to an event. Once the dynamic entry code is transitioned from the inoperable state to the functional state, the entry code can be used to gain admission to an event. Aside from this primary aspect of the invention, the invention is also linked in further embodiments to a ticketing system which improves further upon the security of tickets and their being linked to verified purchasers, the trustworthiness of re-selling tickets and purchasing re-sold tickets. Aside from hiding the entry code until a certain location has been reached, or a certain time before the event begins in order to mitigate against the ability to re-sell tickets in advance or against the fraudulent forging of tickets, the use of a ticketing system which requires the name of a ticket holder to be provided prior to purchase of the ticket is envisaged. The ticketing system will require the setting up of an account on the ticketing system. The user account will be preferably linked to an associated mobile user device, such as a smartphone or smartwatch or the like. A device ID, such as an IMEI (International Mobile Equipment Identity) or UDID (Unique Device Identifier), may be used as an attribute of a user ID for their account. The user will only be able to purchase tickets using their account on the ticketing system. Suspicious behavior can be detected and appropriate action taken against user(s) of the ticketing system who re-sell (or gift away) too many of their tickets or do not purchase and consume their tickets in line with a generally standard behavior of genuine fans. A user credibility rating is assigned to each user in this regard.

Figure 1:
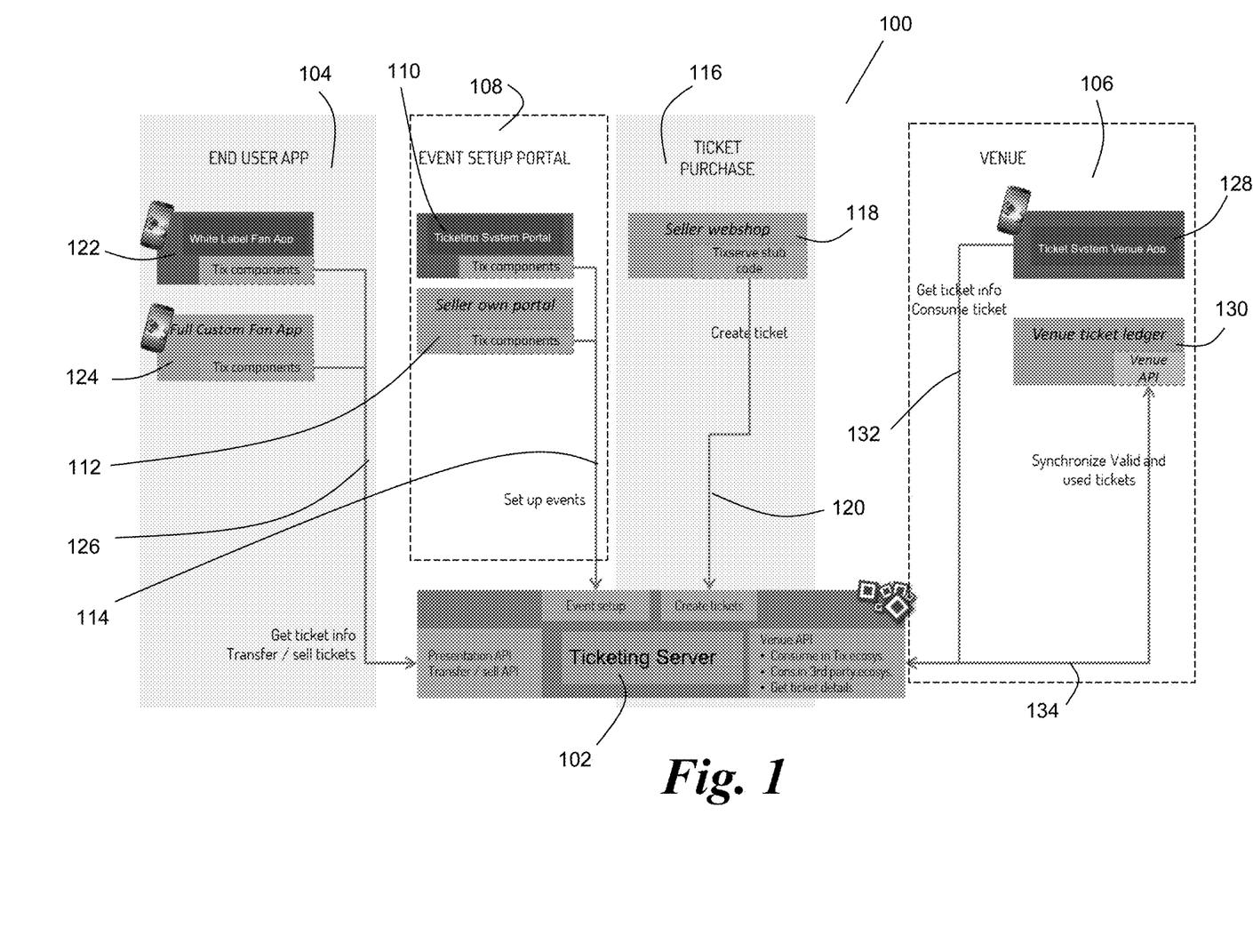
FIG. 1 is a diagrammatic view of a ticketing system in accordance with the present invention.

Referring to FIG. 1, there is provided a ticketing system indicated generally by reference numeral 100. The ticketing system 100 is suitable for issuing electronic tickets which are to be stored on mobile user devices and displayed on the mobile user devices in purely electronic form. The tickets issued by the ticketing system 100 of the present invention are not envisaged to be printed into a hardcopy form.

The ticketing system 100 comprises a ticketing server 102. The ticketing server 102 is capable of communicating with an end user app 104 which will be installed on a mobile user device (not shown). The ticketing server 102 will issue an electronic ticket (not shown), comprising a dynamic entry code (not shown), which can be viewed on the end user app 104. It will be understood that multiple electronic tickets, each associated with different events, can be stored on the mobile user device. In a preferred embodiment, the electronic tickets are stored in a memory of the mobile user device so that the user does not require a data link to the ticketing server 102 if they wish to view and/or use their electronic ticket(s). This could be particularly important if there is no network connectivity available in the event location, or, if the event is abroad, where data roaming charges may apply.

A venue 106 where a limited admission event, also known as a ticketed event, will be held is shown in FIG. 1. The event is initially set up via an event set up portal 108 using a ticketing system portal 110 or a primary ticket agent's own set up portal 112. Whether the event the setup using the ticketing system portal 110 or using the primary ticket agent's own server portal 112, the ticketing server 102 will receive event information via a communications link 114 regarding the event including the number of tickets which will be made available, the defined market price of the tickets, and so on. A user purchases an electronic ticket from a primary ticket agent, which is a third party portal 118, and which forms part of a larger ticket sales network 116. As the user is being brought through the ticket purchase process, the third party portal 118 will contact the ticketing server 102 via a communication link 120. The third party portal 118 reserves a ticket with the ticketing server 102 at this point of the process.

The user will continue with the ticket purchase process via the third party portal 118 and once a payment process has been successfully completed, which will be done via a third party payment gateway (not shown), the electronic ticket will be transferred to the end user app 104 via a communications link 126 from the ticketing server 102, The end user app 104 can be a ticketing system white label app 122 which can be integrated into an existing venue-related app or ticketing-related app, or, the end user app 104 could be a fully customized ticketing system app 124.

In a preferred embodiment, in order to improve the security of the tickets and prevent ticket touting and fraudulent behavior, it will be compulsory for the user to provide a name for each ticket being purchased. In this manner, at the time of purchase, a name is associated with each ticket being bought. At the point of entry to an event, only a person having a valid photographic identification, which matches the name associated with the ticket will be admitted entry to the event using that ticket. It will be understood that not every person may have their identity checked, but the threat to do so will be enough to make individuals very hesitant to purchase a ticket for a ticket tout. If a ticket is re-sold through the permitted channels, a name change will be allowed on the ticket.

In a further embodiment, it may be compulsory for the user to provide a name and telephone number for each ticket being purchased, or a telephone number for at least one ticket in a batch of tickets being purchased simultaneously by a user. In this manner, at the time of purchase, a name is associated with each ticket being bought and a telephone number is associated with the ticket (or batch of tickets) being purchased. The system may then only allow a ticket to be downloaded and stored on a mobile user device, where the telephone number of the mobile user device matches the telephone number provided at the time of purchase.

When the electronic ticket has been downloaded and stored onto the user's mobile user device, the electronic ticket will comprise a dynamic entry code which will initially be stored on the mobile user device in an inoperable state. At an appropriate time and/or geographical location and/or with a controlled trigger such as a broadcast command from the ticketing server or receipt of a trigger code by use of an activator which is physically located adjacent an entry point of the event, the dynamic entry code will be transitioned from the inoperable state into a functional state. In an alternative embodiment, it is foreseen to withhold a portion of the entry code from storage on the mobile user device until the controlled trigger is activated. At such time, the controlled trigger will cause the remaining portion of the entry code to be received by the user's mobile user device and allow the dynamic entry code to transition from the inoperable state to the functional state. It will be appreciated that such an embodiment would only be suitable where connectivity with the mobile user device could be substantially guaranteed.

Once the electronic ticket has been changed such that its dynamic entry code has been transitioned from the inoperable state to be functional state, the electronic ticket can be presented at a venue 106 for verification. At this point, event staff (not shown) will use a ticketing system venue app 128 and inform the ticketing server 102 via communication link 132 that the electronic ticket has been used/consumed. In a preferred embodiment, the ticketing server 102 will inform a venue ticket ledger 130 via a communications link 134 that the electronic ticket has been found. In this way, the venue 106 will keep a record of electronic tickets which have been used for an event.

When a user attempts to gain entry to the event 106 by presenting the electronic ticket, the event staff using the ticketing system venue app 128 may be prompted to check the identification of the user. This will be done randomly, or in line with any event or ticketing system policy, as a user of the ticketing system 100 attempts to gain entry to an event when using an electronic ticket purchased through the ticketing system 100. If a ticket does not have a telephone number associated with it, then the event staff may be prompted to check the identification of the user of that ticket. This could be the case where a batch of tickets were bought by a lead user, but other members of the group did not associate their telephone number with their ticket after the purchase, which would be possible to do in a preferred embodiment. The ticketing system policy may be alternatively to check a certain percentage of ticket holders. The percentage of identification checks may be increased or decreased, on-the-fly, in real-time, in response to queue lengths, health and safety instructions for law enforcement, and the like. Moreover, if the ticketing system 100 has detected suspicious behavior on the part of a user, then the user's account may be flagged as a "need-to-check" account and the ticketing server 102 will inform the event staff via the ticketing system venue app 128 that the identification of the user needs to be checked as the user is attempting to gain entry to the event 106. It is also envisaged to perform random checks of user's IDs and in general the checking of user's IDs will be carried out in line with an event organizer's policy and/or in line with a policy of the ticketing system 100.

Figure 2:
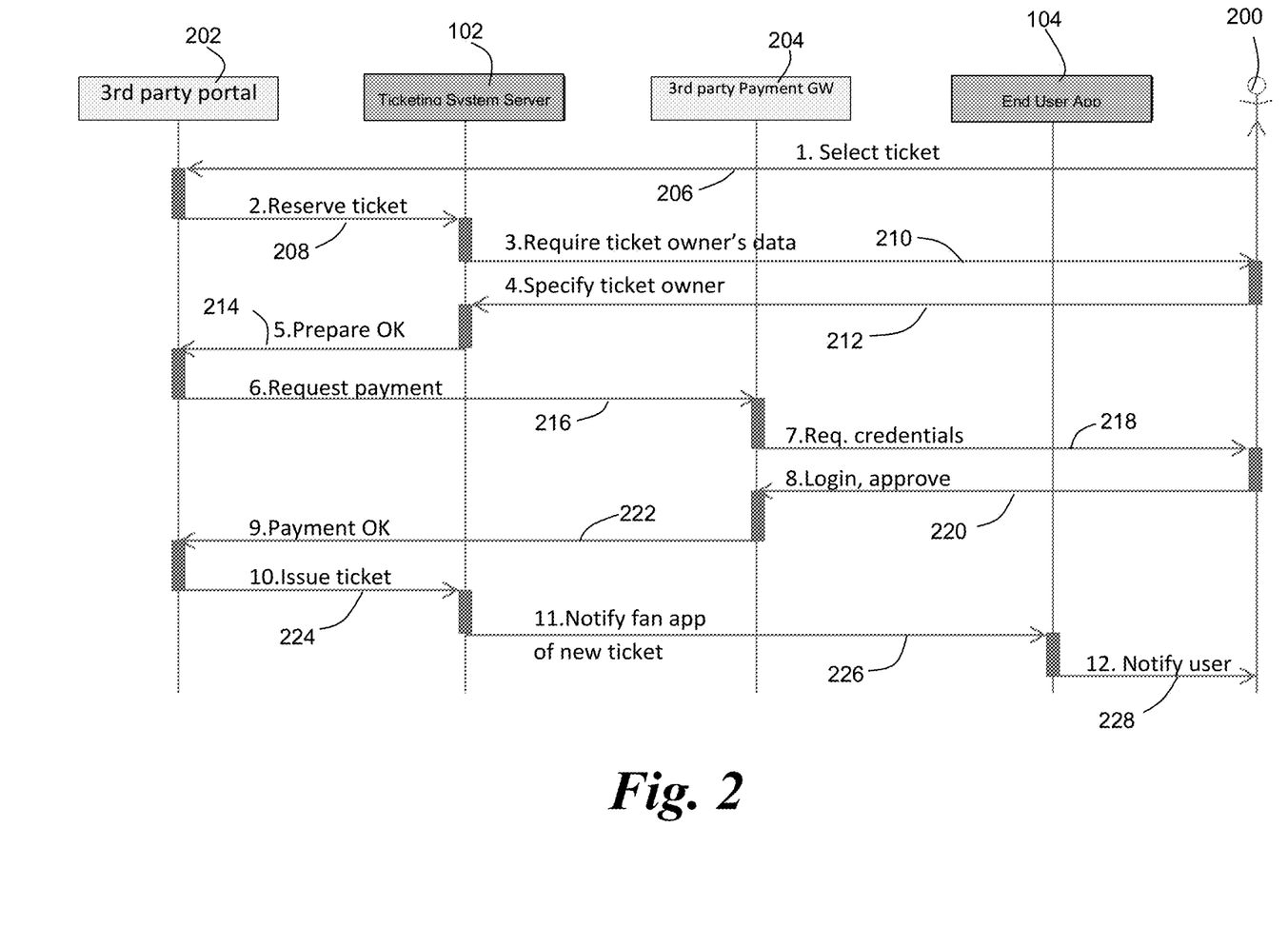
FIG. 2 is a flow diagram of the steps involved in purchasing an electronic ticket in accordance with the ticketing system of the present invention.

Looking at the ticketing system 100 in more detail, the process of purchasing a ticket is shown in FIG. 2. In a first step 206, a user 200 selects a ticket for an event which they wish to attend. The ticket for the event is sold via a third party portal 202. The third party portal 202 requests the ticketing server 102 to reserve a ticket in step 208. In step 210, the ticketing server 102 of the present invention will request data for the ticket owner. If the user 200 already has a ticketing account, the user 200 may log into their account on the ticketing server 102 which will automatically populate the required ticket owner information. Alternatively, the user 200 will be directed to set up a new ticketing account and enter their details. Their details will include their name and a mobile telephone number. A mobile user device can then be verified via a SMS verification code. The mobile user device will then be associated to the user 200. The end user app 104 will be installed on the mobile user device. In an alternative embodiment, the provision of a name and telephone number at the time of purchase may be sufficient to allow a user to purchase one or more tickets (with each ticket being associated with a different name at the point of purchase) and the user 200 will can then be directed to set up a new ticketing account and enter their details at a later date.

In step 212, the user 200 has provided the details of the ticket owner to the ticketing server 102. The ticketing server 102 then informs the third party portal 202 that it is satisfied to issue an electronic ticket to the user 200, in step 214. This step may in a preferable embodiment include the step of the ticketing server 102 checking a user's credibility rating (discussed further hereinbelow) prior to informing the third party portal 202, and only informing the third party portal 202 that it is satisfied to issue an electronic ticket to the user 200 if the ticketing server 102 determines that the user credibility rating is above a predefined threshold. In step 216, the third party portal 202 request payment from the user 200 via a third party payment gateway 204. In step 218, the third party payment gateway 204 requests the user to approve the purchase amount. Once the user 200 has approved the purchase amount in step 220, the third party payment gateway 204 informs the third party portal 202 in step 222 that the payment has been successfully made. The third party portal 202 then instructs the ticketing server 102 to issue a ticket, in step 224. In step 226, the electronic ticket is issued to the end user app 104 installed on the mobile user device associated with the ticketing account which the user 200 log into or created earlier in the process. Finally, the user 200 is notified of the issuance of the ticket by the end user and 104, in step 228.

In this way, the ticketing server 102 is aware of the ticket owner's data for each ticket which allows for monitoring and management of the electronic tickets. For example, if a user 200 wishes to re-sell their ticket, then the ticketing system 100 is established in such a fashion as to require the engagement of the ticketing server 102 in order to re-sell the ticket in a compliant manner. The electronic tickets may be re-sold within the control and management of the ticketing system 100, as a blind re-sale where the purchaser is not known to the seller, or, as a direct re-sale where the purchaser is known to the seller.

Figure 3A:
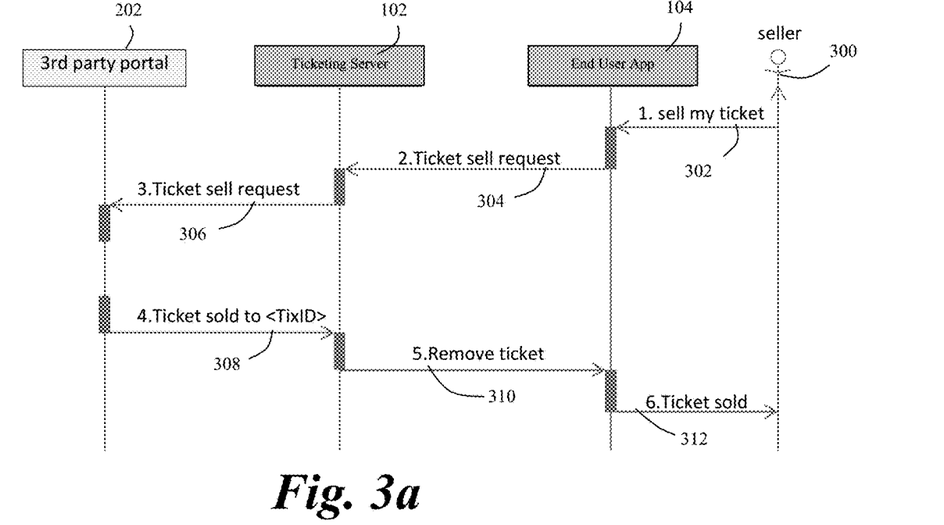
FIG. 3a is a flow diagram of the steps involved in re-selling an electronic ticket in a blind re-sale, in accordance with the ticketing system of the present invention.
Figure 3B:
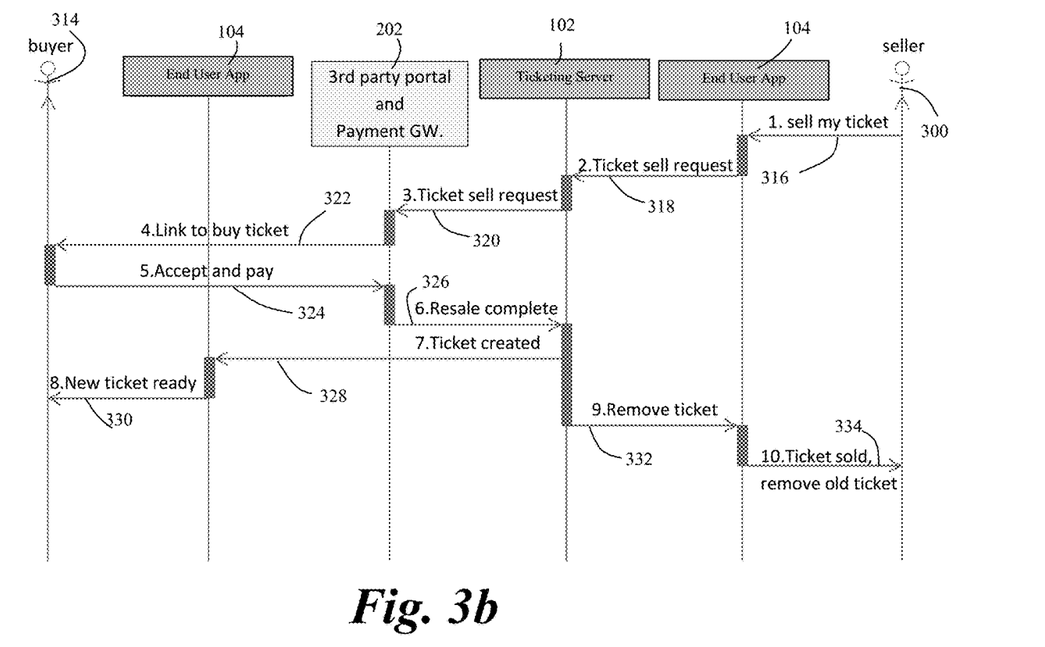
FIG. 3b is a flow diagram of the steps involved in re-selling an electronic ticket in a direct re-sale, in accordance with the ticketing system of the present invention.

FIG. 3a shows the process which is followed for a blind re-sale, and, FIG. 3b shows the process which is followed for a direct re-sale.

Referring to FIG. 3a, a seller at 300 selects the option to re-sell their ticket using the end user app 104, in step 302. The end user app 104 forwards the ticket re-sell request to ticketing server 102 in step 304. In step 306, the third party portal 202 is informed that a ticket for the event is to be re-sold. It will be understood that the third party portal 202 and the ticketing server 102 may be configured to allow the re-sale of a ticket at the same price as defined market price, or at a different price to the defined market price. A price range may be presented to the seller 300, whereas that price range is dictated by the third party portal 202. Once the third party portal 202 has re-sold the ticket, the third party portal 202 in step 308 informs the ticketing server 102 that the ticket has been re-sold. The ticketing server 102 will be aware of the account ID of the purchaser and will issue the re-sold ticket to the end user app of the purchaser. At the same time as shown in step 310, the ticketing server 102 will remove the re-sold ticket from the end user app 104 of the seller 300. In step 312, the seller 300 is notified by the end user app 104 that the ticket has been sold. Payment for the re-sold ticket will be dealt with separately via the third party payment gateway (not shown) which will be directed by the third party portal 202 to make a payment to the seller 300. In an alternative embodiment, the re-sale of the ticket by the seller 300 could be handled without any need for the third party portal 202 as the re-sale process could be handled and accommodated by the ticketing server 102 itself.

Looking now at FIG. 3b, the seller 300 in step 316 informs the end user app 104 that they wish to re-sell their ticket to a purchaser 314. The seller 300 provides the information of the purchaser 314, such as their ticketing account username and/or their mobile telephone number and/or their e-mail address and/or their ticketing account identification number. In step 318 this ticket re-sale request afforded to the ticketing server 102 which in turn, in step 320, forwards the request to the third party portal 202. The third party portal 202 forwards an invitation to the purchaser 314, in step 322, to purchase the tickets at a price defined by the seller 300 which is within the allowable range set by the third party portal 202 and/or the ticketing server 102. In step 324, the purchaser 314 accepts the invitation and purchases the ticket. Once the payment from the purchaser 314 has been successfully completed, the third party portal 202 informs the ticketing server 102 that the re-sale of the tickets have been completed, in step 326. The ticketing server 102 then creates a new ticket in step 328 and issues the ticket to the end user app 104 of the purchaser 314. The purchaser 314 is notified of the issuance of the ticket in step 330. In step 332, the ticketing server 102 removes the re-sold ticket from the end user app 104 of the seller 300. The seller 300 is notified in step 334 that the ticket has been re-sold and that the re-source ticket has been removed from their end user app 104. In this way, the re-sale of electronic tickets which have been issued in accordance with the ticketing system 100 of the present invention can be monitored and managed by the ticketing server 102 of the ticketing system 100 of the present invention. The ticketing system 100 will not allow the re-sale of tickets where a user has been determined to be acting in a suspicious manner. The determination of suspicious activity can be based on a user seeking to re-sell a large number of tickets which they have purchased. This is discussed further hereinbelow, when detailing, the user credibility rating which is calculated for each user. The ticketing server 102 can change the ticketing account of such a user to a "need-to-check" status so that event staff at a venue will check the identity of any persons attempting to gain entry to the event using a ticket associated with this flagged user account.

In a preferred embodiment, it is envisaged to request a facial image of a user to be uploaded when creating a user account so that a photographic identification card can be checked at a venue against the facial image of the user for that particular user account. However, a user's name may be sufficient in some instances.

Preferably in conjunction with the ticketing system 100 as described above, a dynamic entry code is envisaged to be used as part of the electronic tickets issued by the ticketing system 100. It will be understood that the dynamic entry code envisaged as part of this invention may operate separately from the ticketing system described hereinbefore and further hereinbelow. At present, some tickets are presented electronically and are known to have a dynamic aspect to such tickets including animations and audio. It is not known from the prior art for an electronic ticket to comprise a dynamic entry code. It is foreseen that the dynamic entry code, which forms the main thrust of the present invention, may be used with the electronic tickets known from the prior art, without requiring the other elements of the ticketing system of the present invention herein described.

Figure 4A:
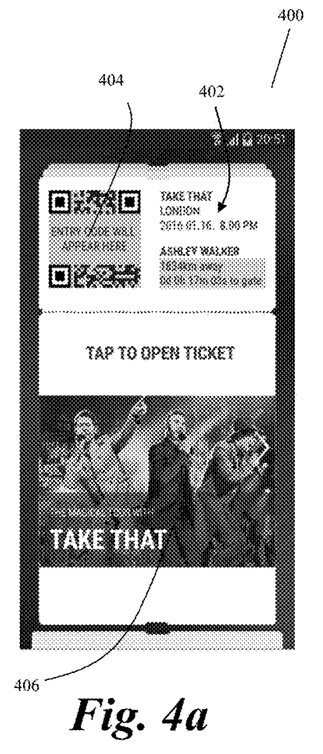
FIG. 4a is a front view of a screenshot of an electronic ticket being displayed on a mobile user device, with an entry code of the electronic ticket being in an inoperable state.
Figure 4B:
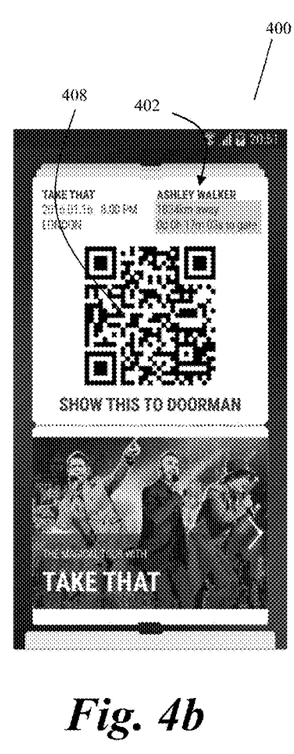
FIG. 4b is a front view of a screenshot of the electronic ticket of FIG. 4a, with the entry code being in a functional state.
Figure 4C:
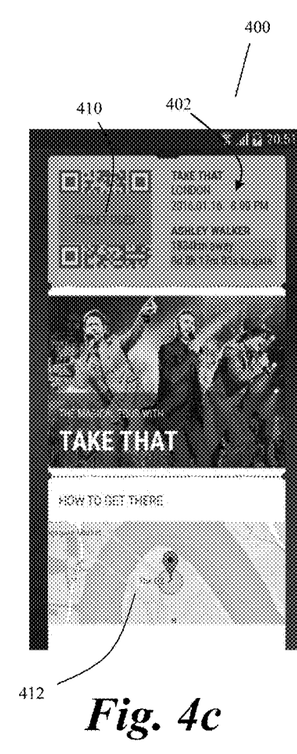
FIG. 4c is a front view of a screenshot of the electronic ticket of FIG. 4a, with the entry code being in a consumed state.

Referring now to FIGS. 4a, 4b and 4c, a screenshot of an electronic ticket indicated generally by reference numeral 400, which is held on a mobile user device, is shown. The electronic ticket 400 comprises event and/or user information indicated generally by reference numeral 402. The event and/or user information 402 may contain a user's name, the event's name, the event's location, the event's start time, the venue's opening time, and so on. Other event information such as an event image 406 may be shown or a venue's location map 412 may be shown. Alternatively advertisements for similar event which may be of interest could also be displayed.

As discussed hereinbefore, the dynamic entry code will comprise an inoperable state and a functional state. In FIG. 4a, the dynamic entry code is in its inoperable state and an inoperable entry code 404 is displayed. In FIG. 4b, the dynamic entry code has been transitioned from its inoperable state to a functional state and the functional entry code 408 is available on the mobile user device. In this example, the dynamic entry code is a Quick Response (QR) code. Therefore, the inoperable entry code 404 does not display any QR code or only displays a portion of the QR code; and, the functional entry code 408 displays the QR code in a format which can be read by a scanner at an event. It will be appreciated that, when the dynamic entry code is a visual code such as a QR code or a barcode, the venue is not required to use the ticketing system venue app and can simply use legacy scanners which may already be installed. I a preferred embodiment, the visual code may be animated such that the QR code or barcode is animated to prevent screen shots being taken of the visual and being subsequently used in a fraudulent manner. In this case, once the event staff have scanned the dynamic entry code successfully and the legacy scanner indicates that entry to the event is permitted, the event staff may interact with the electronic ticket 400 held on the user's mobile user device in order to consume the electronic ticket 400. This may be done by swiping across the functional entry code and entering a PIN or alphanumeric code known only to the event staff which can be changed on an event to event basis. It will be appreciated that in the embodiment where the event staff are used to transition the ticket 400 from the inoperable state to the functional state through entry of a PIN code which is only known to event staff, the entry of this PIN code may also serve as a way of consuming the electronic ticket 400 at the same time. Alternatively, in order to mark the ticket 400 as consumed, the event staff could scan a visual code which is only in their possession. Any of these actions by the event staff would trigger the electronic ticket 400 to be now displayed as being consumed, as is shown in FIG. 4c. If the user's mobile user device is in communication with the ticketing server, then the consumption of the ticket 400 can be communicated to the ticketing server. In a preferred embodiment, the venue will use the ticketing system venue app and the manual consumption of the electronic ticket 400 by event staff will not be necessary. In this preferred embodiment, the ticketing system venue app will be automatically notified of the successful scan of the electronic ticket 400 and will inform the ticketing server accordingly.

In a further preferred embodiment, the dynamic entry code may not be a visual code which is non-readable by a human, such as a QR code or a barcode, but could be a hidden alphanumeric key which uses a challenge response protocol. In such a system, the electronic ticket 400 will simply show an indication such as "Not Ready"/"Ready" or "Inactive"/"Active" or "Wait"/"Proceed to entry point" on the electronic ticket 400. The sign will indicate whether the electronic ticket 400 is in its inoperable state or its functional state. Once the electronic ticket 400 has indicated it is in its functional state, the user can approach the entry point for the event and event staff will use the ticketing system venue app to send a challenge and receive a response from the end user app on the user's mobile user device. In this way, the entry code is never displayed to the user at all and therefore makes it very difficult for any fraudulent forging of tickets to take place. The validation of the ticket at the entry point would be completed using the challenge-response protocol.

Figure 5A:
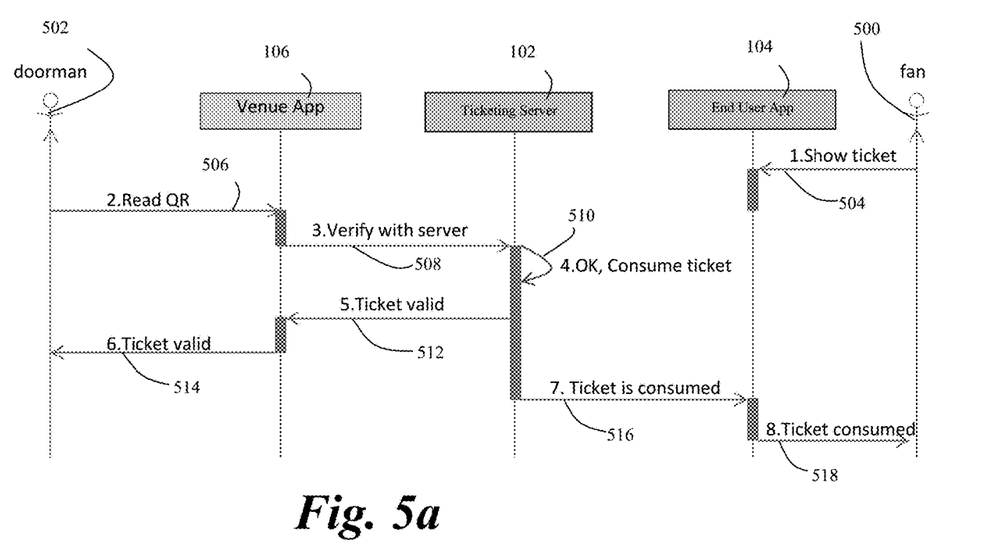
FIG. 5a is a flow diagram of the steps involved in verifying an electronic ticket to admit entry to an event, using an entry scanner which is communicably connected to a ticketing server of the ticketing system of the present invention.
Figure 5B:
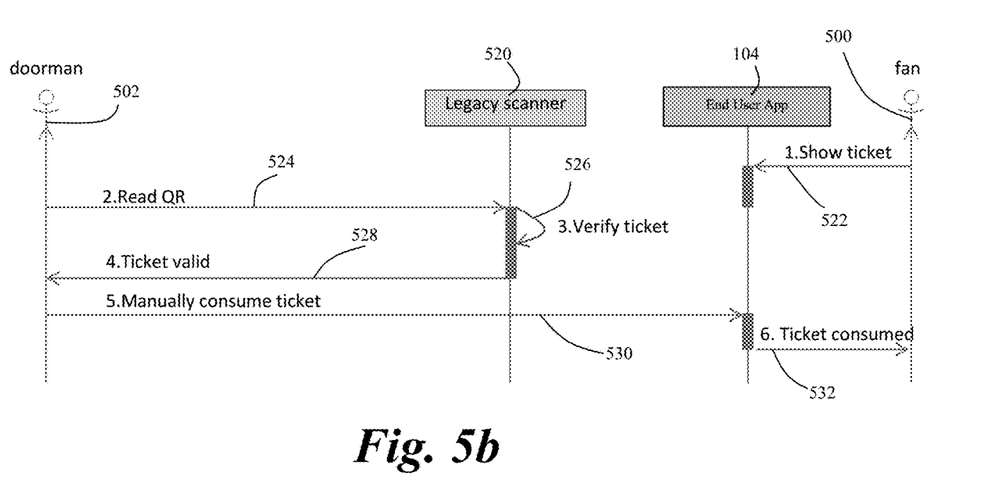
FIG. 5b is a flow diagram of the steps involved in verifying an electronic ticket to admit entry to an event, using a legacy entry scanner which is not communicably connected to a ticketing server of the ticketing system of the present invention.

FIGS. 5a and 5b show the verification of the electronic ticket 400 at a venue. FIG. 5a shows the process followed where the venue has access to the ticketing system venue app 106, and. FIG. 5b shows the process followed where the venue only has legacy scanners available at the venue.

With reference to FIG. 5a, the user 500 who is attempting to gain admission to the event will present their ticket using the end user at 104 to a member of the event staff 502, as shown in step 504. The event staff 502 will read the dynamic entry code, which forms part of the electronic ticket, using the ticketing system venue app 106 in step 506. The ticketing system venue app 106 may preferably be connected to a QR scanner or barcode scanner or camera capable of operating as same. In step 508, the ticketing system app 106 will contact the ticketing server 102 to verify that the electronic ticket is legitimate. The ticketing server 102 will, in step 510, confirm that the electronic ticket is legitimate and also check if the user account holding that electronic ticket is in a need-to-check state and if so will require the event staff 502 to check the identification of the user 500 who is attempting to gain admission to the event. If the user account is in a verified state, then there is no requirement for the event staff 502 to check the identification of the user 500. The validity of the ticket is transmitted to the ticketing system venue app 106 in step 512, along with a notification for the event staff 502 to check the user's identification, i.e. a 'need-to-check' instruction, if necessary. The ticketing system venue app 106 notifies the event staff 502, in step 514, of the validity of the ticket. The ticketing server 102 will also consume the ticket, in the sense of marking the ticket as being a valid and used ticket, and will send this information from the ticketing server 102 to the end user app 104, as shown in step 516. The user 500 is notified that the ticket has been concerned in step 518, by the end user at 104.

In FIG. 5b, the user 500 who is attempting to gain admission to the event will present their ticket using their end user app at 104 to a member of the event staff 502, as shown in step 522. The event staff 502 will read the dynamic entry code, which forms part of the electronic ticket, using a legacy scanner 520 in step 524. The legacy scanner 520 will verify that the electronic ticket is legitimate by scanning a visual functional entry code on the electronic ticket, as indicated in step 526. The validity of the ticket is indicated to the event staff 502 in step 528. This may be by way of a green light on the scanner 520. The event staff member 502 will then manually consume the ticket, as indicated in step 530, by interacting with the end user app 104 on the user's mobile user device. In a preferred embodiment, this interaction will require the input of a PIN in order to change the ticket to being consumed/used. The end user app 104 may communicate this on to the ticketing server (not shown) if a data link is possible and will notify the user 500 that the ticket has been consumed in any event as is indicated in step 532.

It will be readily appreciated that the transition of the dynamic entry code from being in its inoperable state to its functional state is a very important part of the invention. This may be carried out in a number of different ways including, but not limited to, transitioning the dynamic entry code from its inoperable state to its functional state at a predetermined time. If for example, an event has a start time of 8.00 pm, and the entry point at the venue is opened at 7.00 pm, then the dynamic entry code may be transitioned from its inoperable state to its functional state at 7.00 pm. The time may be taken from the mobile user device, or more preferably from the ticketing server or from the wireless network which the mobile user device is connected to. Alternatively, geo-fencing may be used to transition the dynamic entry code from its inoperable state to its functional state. For example, the dynamic entry code may be transitioned once the mobile user device comes within 100 m of the entry point of the venue. It'll be appreciated that many mobile user devices comprise GPS means and similar location determination means which will be utilized in this embodiment. Preferably, the dynamic entry code will require the mobile user device storing the electronic ticket to be in a certain geographical location at or after a certain time in order for the dynamic entry code to the transitioned to its functional state. This will minimize the opportunity for a ticket tout to re-sell the electronic ticket. A further alternative is to use a broadcast signal which will be transmitted from a position adjacent the venue and will cause, when received by the mobile user device, the dynamic entry code to be transitioned to its functional state. In this way, the event organizers can decide when the entry codes for the tickets for the event will be transitioned into their functional state. It is foreseen to transition a subset of the tickets so that the permitted entry to the venue can be staggered. For example, tickets which are for seats at upper levels of a venue may be transitioned to a functional state before tickets which are for seats at lower levels in the venue. This may facilitate the lessening of any crowding issues as many users attempt to gain entry to a venue at the same time. In yet another embodiment, it is envisaged to require of their use of an activator which is physically present close to a venue. For example, this could require the end user app to scan a visual code, such as a QR code, adjacent an entry point for a venue in order to transition the dynamic entry code stored on the mobile users device from its inoperable state to its functional state. It is also envisaged that WiFi networks and the like which are geographically located could be used for transitioning the dynamic entry code from its inoperable state to its functional state.

As will be readily understood, many different techniques can be used to transition the dynamic entry code to its functional state.

In another embodiment of the present invention, a user credibility rating will be established for each user of the ticketing system of the present invention. The user credibility rating will be an indication of the genuineness of the user as a fan. If a user purchases a number of tickets and uses those tickets themselves and passes any user account verification checks, then that user should have a relatively high user credibility rating. If a user is seen to re-sell a large number of the tickets which they have bought, then such a user may be a ticket tout and would receive a relatively low user credibility rating. In one embodiment, an electronic ticket will only be issued to a user if the user credibility rating associated with the mobile user device is above a predefined threshold. In a further alternative embodiment it is foreseen that the dynamic entry code will only be transitioned from the inoperable state to the functional state if the user credibility rating associated with the mobile user device is above a predefined threshold. The threshold is adjustable and may be set by the third party or by the ticketing server. The user credibility rating is calculated based on a user's historical ticketing transactions, and, the user's historical ticketing transactions comprise one of more of: number of tickets purchased; aggregate value of tickets purchased; number of tickets re-sold; aggregate value of tickets re-sold; number of tickets used; aggregate value of tickets used; number of tickets not used; aggregate value of tickets not used. Thus, the user credibility rating may be calculated based on a ratio of the number of tickets re-sold as compared to the number of tickets used, or, based on a ratio of the aggregate value of tickets re-sold as compared to the aggregate value of tickets used. Alternatively, the user credibility rating may be calculated based on a ratio of the number of tickets purchased as compared to the number of tickets re-sold. It will be appreciated that the threshold for determining whether a user is genuine or suspicious can be adjusted and set to a pre-determined value. In one embodiment, a user credibility rating of less than 0.95 would be seen to be suspicious which would therefore allow a user to sell up to 5% of the tickets bought, or, to sell tickets having a value of up to 5% of the total value of the tickets which they have bought. It will be understood that gifting tickets away for free may be viewed as a re-sale of the ticket and be counted towards the calculation of the user credibility rating.

It is also understood that, in a preferred embodiment, the restrictions on a re-sale of a ticket may only be applied where the sale is between two parties known to one another as this will raise the possibility that financial compensation could be organized between the parties, outside of the ticketing system of the present invention. If the re-sale is made between two parties, whose identities are not made known to one another during the process, then any restrictions on such a type of sale may be lifted and not applied.

In a further embodiment, the user credibility rating may be calculated in a number of ways, using different algorithms. Purely by way of example only, one such algorithm would be:

$$\text{User Credibility Rating} = 1 - \frac{\Sigma \text{ value of tickets resold by user to known purchasers}}{\Sigma \text{ value of tickets used for entry to events by user}}$$

It will be readily understood that the electronic ticket suitable for providing entry to an event may or may not be stored on the mobile user device. It must be capable of being stored on the mobile user device, but it is not necessary for the electronic ticket to be stored on the mobile user device. In particular, the dynamic entry code which forms part of the electronic ticket does not need to be stored on the mobile user device. Indeed, it may be advantageous to make the dynamic entry code, when in its functional state to be unavailable to a user; and, by not storing the dynamic entry code on the mobile user device, this objective could be achieved as the dynamic entry code would be not present. In such an embodiment, the inoperable state of the dynamic entry code would be stored on the mobile user device and when the dynamic entry code had to be transitioned from the inoperable state to the functional state, the dynamic entry code in its functional state would be received and stored onto the mobile user device. Of course, it is further envisaged that the dynamic entry code, even in both of its versions: inoperable state and functional state, is stored on the mobile user device but with the dynamic entry code in its functional state being unavailable to the user. This could be storing the dynamic entry code in its functional state in a secured, potentially encrypted, partitioned section of memory on the mobile user device. In such a manner, the dynamic entry code, and in particular, in a preferred embodiment, the functional state of the dynamic entry code will be made unavailable and/or inaccessible.

The terms "comprise" and "include", and any variations thereof required for grammatical reasons, are to be considered as interchangeable and accorded the widest possible interpretation.

It will be understood that the components shown in any of the drawings are not necessarily drawn to scale, and, like parts shown in several drawings are designated the same reference numerals.

It will be further understood that features from any of the embodiments may be combined with alternative described embodiments, even if such a combination is not explicitly recited hereinbefore but would be understood to be technically feasible by the person skilled in the art.

The invention is not limited to the embodiments hereinbefore described which may be varied in both construction and detail.

What is claimed is:

1. An electronic ticket suitable for providing entry to an event, the electronic ticket being stored on a mobile user device, wherein the electronic ticket comprises a dynamic entry code for the event such that the dynamic entry code is transitionable from an inoperable state to a functional state, whereby entry to the event is only possible when the dynamic entry code has been transitioned to the functional state; wherein, the dynamic entry code is a visual code which is non-readable by humans, such that the inoperable state of the dynamic entry code prohibits the visual code from being displayed by the mobile user device and the functional state of the dynamic entry code permits the visual code to be displayed by the mobile user; wherein, at the time of purchase the electronic ticket is assigned to one or more of: a ticket holder's name, a ticket holder's telephone number, and a ticket holder's device ID, such that, prior to allowing the dynamic entry code to be transitioned from the inoperable state to the functional state, one or more of the ticket holder's name, the ticket holder's telephone number, and the ticket holder's device ID is checked to ensure a match with a name associated with the mobile user device, a telephone number of the mobile user device, and a device ID of the mobile user device, respectively, wherein at least a portion of the dynamic entry code in its functional state is unavailable to a user of the mobile device until arrival at an entry point of the event, and wherein the dynamic entry code is transitioned from the inoperable state to the functional state based on an activator which is physically located adjacent an entry point of the event, the activator being operable to deliver said unavailable portion of the dynamic entry code to the mobile user device.

2. An electronic ticket as claimed in claim 1, wherein the dynamic entry code is transitioned from the inoperable state to the functional state in response to the mobile user device scanning a code which is physically located adjacent an entry point of the event.

3. An electronic ticket as claimed in claim 2, wherein the scanned code is a portion of the dynamic entry code.

4. An electronic ticket as claimed in claim 1, wherein the ticket holder's telephone number assigned to the electronic ticket must match the telephone number of the mobile user device in order to allow the dynamic entry code to transition from the inoperable state to the functional state.

5. An electronic ticket as claimed in claim 1, wherein the ticket holder's telephone number assigned to the electronic ticket must match the telephone number of the mobile user device in order to allow the dynamic entry code to become stored on the mobile user device.

6. An electronic ticket as claimed in claim 1, wherein the dynamic entry code is transitioned from the inoperable state to the functional state if a user credibility rating associated with the mobile user device is above a predefined threshold.

7. An electronic ticket as claimed in claim 1, wherein the visual code is a Quick Response (QR) code which is only displayed on a screen of the mobile user device when the QR code has been transitioned to the functional state.

8. An electronic ticket as claimed in claim 1, wherein the visual code is a barcode which is only displayed on a screen of the mobile user device when the barcode has been transitioned to the functional state.

9. An electronic ticket as claimed in claim 1, wherein the dynamic entry code is a hidden key which uses a challenge response protocol, such that in use it is indicated whether the electronic ticket is in its inoperable or functional state without the dynamic entry code being displayed to the user.

10. An electronic ticket as claimed in claim 1, wherein the activator that causes the dynamic entry code to transition from the inoperable state to the functional state is under the control of the event staff.

11. A method of providing an electronic ticket suitable for providing entry to an event, the electronic ticket capable of being stored on a mobile user device, wherein the method comprises:
assigning, at the time of purchase, the electronic ticket to one or more of: a ticket holder's name, a ticket holder's telephone number, and a ticket holder's device ID;
issuing the electronic ticket, the electronic ticket comprising a dynamic entry code to allow access to the event such that the dynamic entry code is transitionable from an inoperable state to a functional state;
storing at least a portion of the dynamic entry code on the mobile user device, the dynamic entry code comprising a visual code which is non-readable by humans;
checking one or more of the ticket holder's name, the ticket holder's telephone number, and the ticket holder's device ID to ensure a match with a name associated with the mobile user device, a telephone number of the mobile user device, and a device ID of the mobile user device, and only allowing the dynamic entry code to be transitioned from the inoperable state to the functional state where such a match exists;
transitioning the dynamic entry code to the functional state to allow entry to the event; whereby,
the inoperable state of the dynamic entry code prohibits the visual code from being displayed by the mobile user device and the functional state of the dynamic entry code permits the visual code to be displayed by the mobile user, wherein at least a portion of the dynamic entry code in its functional state is unavailable to a user of the mobile device until arrival at an entry point of the event, and
the method further comprises the step of transitioning the dynamic entry code from the inoperable state to the functional state subsequent to an interaction with an activator which is physically located adjacent an entry point of the event, the activator being operable to deliver said unavailable portion of the dynamic entry code to the mobile user device.

12. A method of providing an electronic ticket as claimed in claim 11, wherein the method further comprises the step of transitioning the dynamic entry code from the inoperable state to the functional state subsequent to the mobile user device scanning a code which is physically located adjacent an entry point of the event.

13. A method of providing an electronic ticket as claimed in claim 12, wherein scanning a code comprises scanning a portion of the dynamic entry code.

14. A method of providing an electronic ticket as claimed in claim 11, wherein the method further comprising the step of checking that the ticket holder's telephone number which has been assigned to the electronic ticket matches the telephone number of the mobile user device prior to allowing the dynamic entry code to transition from the inoperable state to the functional state.

15. A method of providing an electronic ticket as claimed in claim 11, wherein the method further comprising the step of checking that the ticket holder's telephone number which has been assigned to the electronic ticket matches the telephone number of the mobile user device prior to allowing the dynamic entry code to be stored on the mobile user device.

16. A method of providing an electronic ticket as claimed in claim 11, wherein the step of transitioning the dynamic entry code from the inoperable state to the functional state is carried out if a user credibility rating associated with the mobile user device is above a predefined threshold.

17. A method of providing an electronic ticket as claimed in claim 11, wherein the method further comprises a step marking the electronic ticket as having been used, once the electronic ticket has been used to provide entry to the event.

* * * * *